United States Patent [19]

Lin

[11] 4,421,798
[45] Dec. 20, 1983

[54] APPARATUS FOR COATING RECORDED DISCS WITH A LUBRICANT

[75] Inventor: Peter T. Lin, E. Brunswick, N.J.

[73] Assignee: RCA Corporation, New York, N.Y.

[21] Appl. No.: 447,139

[22] Filed: Dec. 6, 1982

Related U.S. Application Data

[63] Continuation of Ser. No. 319,920, Nov. 10, 1981, abandoned.

[51] Int. Cl.³ .............................................. B05D 1/02
[52] U.S. Cl. .................................. 427/421; 118/300; 118/316; 239/434; 427/424
[58] Field of Search ....................... 118/300, 316, 326; 239/434; 427/424, 421

[56] References Cited

U.S. PATENT DOCUMENTS

| | | | |
|---|---|---|---|
| 2,532,554 | 12/1950 | Joeck | 299/1 |
| 2,710,589 | 6/1955 | Brunner | 118/51 |
| 3,240,253 | 3/1966 | Hughes | 158/4 |
| 3,382,845 | 5/1968 | Jester | 118/610 |
| 3,539,102 | 11/1970 | Lang | 239/4 |
| 4,309,456 | 1/1982 | Lock | 427/209 |

Primary Examiner—Shrive P. Beck
Attorney, Agent, or Firm—Birgit E. Morris; Donald S. Cohen

[57] ABSTRACT

An apparatus for coating a recorded disc with a thin layer of a lubricant includes a chamber which is divided into two sections by a baffle extending across the chamber and vertically downwardly from the top of the chamber to a point spaced from the bottom of the chamber. An atomizer is mounted at the top of one section of the chamber and is connected to a source of air under pressure and a supply of lubricant. The atomizer is adapted to generate droplets of lubricant in the one section. An air inlet port in the side of the chamber opens into the one section and is connected to a source of air under pressure. An outlet opening is at the top of the other section of the chamber. The flow of air into the one section is controlled to carry the smaller droplets of the lubricant around the bottom of the baffle and up the other section to flow out of the chamber through the outlet port. The larger droplets fall to the bottom of the chamber and are carried away through a drain outlet in the bottom of the chamber.

5 Claims, 1 Drawing Figure

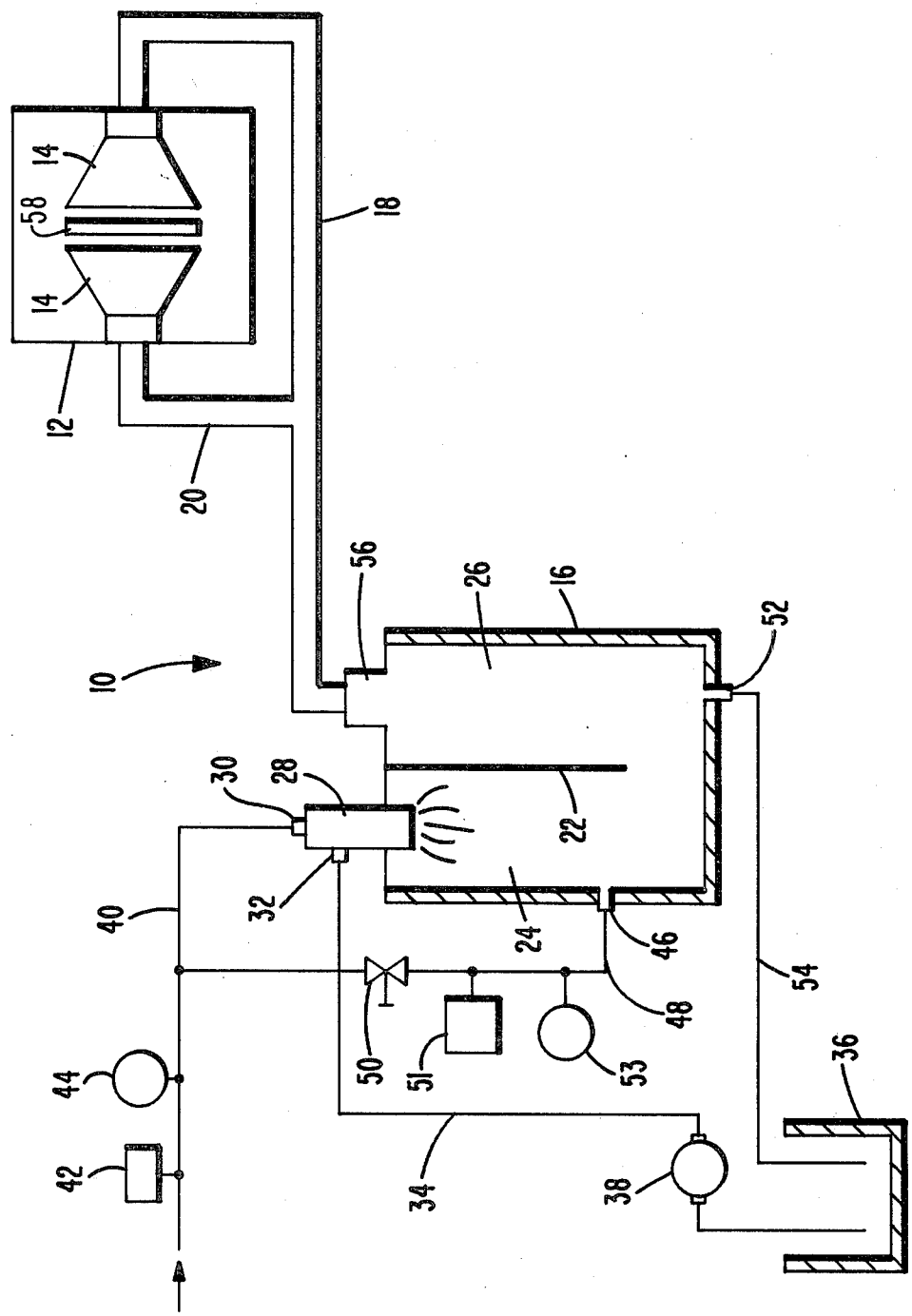

APPARATUS FOR COATING RECORDED DISCS WITH A LUBRICANT

This is a continuation of application Ser. No. 319,920, filed Nov. 10, 1981, now abandoned.

BACKGROUND OF THE INVENTION

The present invention relates to an apparatus for coating recorded discs with a lubricant and particularly to an apparatus for creating droplets of the lubricant.

There has been developed recently a high density recorded disc, e.g., a video disc, in which the recorded information is in the form of a surface relief pattern formed along an information track in the major surfaces of the disc. Preferably, the surface relief pattern is formed in a spiral track, which can be a groove, in the major surfaces of the disc. The disc is played back with a stylus and during playback, the disc is rotated at a relatively high speed which creates friction between the playback stylus and the disc surface. In order to reduce these frictional forces and to prevent wear of the stylus and/or the record, it is desirable to provide a layer of lubricant on the surface of the disc. The lubricant should be uniformly coated over the entire surface of the disc but should be a thin layer, preferably between 200 and 300 Angstroms in thickness, so that it does not interfere with the proper playback of the disc. A suitable lubricant is described in U.S. Pat. No. 4,275,101, Wang et al.

Because of the viscosity of the lubricant, it has been found difficult to achieve the desired thin, uniform coating of the lubricant on the disc. One technique which has been developed is to apply the lubricant in solution in heptane. The lubricant is mixed with heptane, about 0.3 part of lubricant to 100 parts of heptane. The solution is then sprayed onto the surfaces of the disc by passing the disc under a series of oscillating nozzles which apply the solution. Each side of the disc is coated separately.

In order to eliminate the use of the heptane, which is expensive, toxic, flammable and explosive, another coating technique has been developed which is described in the copending application of Brian Ernest Lock, Ser. No. 190,079, filed Sept. 23, 1980, entitles METHOD AND APPARATUS FOR COATING RECORDED DISCS WITH A LUBRICANT now U.S. Pat. No. 4,309,456, issued Jan. 5, 1982. In the coating technique shown and described in the Lock application, streams of air are passed through a layer of the lubricant in a chamber to create droplets of the lubricant in the chamber supported in the air. The lubricant droplets are carried by the flow of air through an outlet opening in the top of the chamber and through suitable pipes to nozzles which are on opposite sides of a path along which a disc is carried. As the disc passes between the nozzles, the lubricant droplets are directed against the surfaces of the disc to provide a thin coating of the lubricant on the disc.

Lubricants have been developed which are a mixture of materials which are incompatible in that they do not dissolve in each other. It has been found that the apparatus of the Lock application for forming the lubricant droplets does not work well with these incompatible lubricant mixtures. Therefore, it is desirable to have an apparatus which will satisfactorily form the lubricant droplets even if the lubricant is such a mixture.

SUMMARY OF THE INVENTION

An apparatus for coating a disc with a thin film of a lubricant includes means for forming droplets of the lubricant. The lubricant droplet forming means includes a chamber having two sections which are connected together along the bottom of the chamber. In one of the sections is means for forming droplets of the lubricant and means for emitting air under pressure to cause the lubricant droplets to flow from the one section into the other section. An outlet is at the top of the other section to allow the air carried lubricant droplets to flow out of the chamber.

BRIEF DESCRIPTION OF THE DRAWING

The FIGURE of the drawing is a schematic showing of a coating apparatus which incorporates the present invention.

DETAILED DESCRIPTION OF THE INVENTION

Referring to the drawing, the coating apparatus of the present invention is generally designated as 10. The coating apparatus 10 includes a coating chamber 12 having therein a pair of opposed coating nozzles 14, and an atomizer chamber 16. Droplets of the lubricant are generated in the atomizer chamber 16 and will flow through pipes 18 and 20 to the nozzles 14.

The atomizer chamber 16 has a baffle 22 extending thereacross from the top thereof to a point spaced from the bottom thereof. The baffle 22 divides the atomizer chamber 16 into an entrance section 24 and an exit section 26 which are connected together along the bottom of the atomizer chamber 16. At the top of the entrance section 24 is an atomizer 28. The atomizer 28 may be of any type which uses air to break up a liquid to generate fine particles of the liquid, such as sonicor Model 035MB1 made by Sonic Development Corp. of Mahwah, N.J. In general, such atomizers include therein two concentric passages, one for the air and the other for the liquid. The passages meet at the restricted exit end of the atomizer so that the air will break up the liquid to form the particles of the liquid. The atomizer 28 has an air inlet port 30 and a liquid inlet port 32. The liquid inlet port 32 is connected by a pipe 34 to a reservoir 36 of the lubricant. A metering pump 38 is connected in the pipe 34 to provide a controlled supply of the lubricant from the reservoir 36 to the atomizer 28. The air inlet port 30 is connected by a pipe 40 to a supply of compressed air, such as an air compressor (not shown). Connected to the air pipe 40 is a flow meter 42 and a pressure guage 44 used to control the flow of the air to the atomizer 28. This type of atomizer will satisfactorily generate droplets of the lubricant whether the lubricant is a single material or a mixture of compatible or incompatible materials.

The atomizer chamber 16 has an air inlet port 46 opening into the entrance section 24 at a level above the bottom of the baffle 22. The air inlet port 46 is connected by a pipe 48 to the pipe 40 to provide a flow of air into the section 24 of the atomizer chamber 16. A control valve 50, flow meter 51 and pessure guage 53 are provided in the pipe 48 to control the flow of air into the atomizer chamber 16. A liquid drain outlet 52 is provided in the bottom of the atomizer chamber 16 at the bottom of the exit section 26. The liquid drain outlet 52 is connected by a pipe 54 to the reservoir 36. The pipe 18 for carrying the lubricant droplets to the nozzles 14, is connected to an outlet opening 56 at the top of the exit section 26 of the atomizer chamber 16.

In the operation of the coating apparatus 10, air and lubricant are fed to the atomizer 28 which generates lubricant droplets in the entrance section 24 of the atomizer chamber 16. The lubricant droplets fall to the bottom of the entrance section 24 where they are picked up by air admitted into the entrance section 24 through the inlet port 46. The lubricant droplets are carried by the air under the baffle 22 and up the exit section 26 to the outlet opening 56. The air carried lubricant droplets then flow through the pipes 18 and 20 to the nozzles 14 where they are directed onto the surfaces of a disc 56 passing between the nozzles 14.

As stated in the Lock et al application, it has been found that lubricant droplets of a size of 2 to 15 microns will achieve the desired thickness of 250-300 Angstroms of lubricant layer on the disc 56. However, the atomizer 28 generates a variety of sizes of lubricant droplets which range from submicron to about 20 microns in size. In the coating apparatus 10, the larger undesired droplets are removed from the flow by the baffle 22 and by controlling the flow of the air entering the port 46. The baffle 22 causes all of the lubricant droplets to pass downwardly close to the bottom of the chamber 16 where they must be lifted upwardly again to flow from the outlet opening 56. By controlling the air flow, only the smaller, lighter lubricant droplets will be carried upwardly through the exit section 26. The larger, undesired lubricant droplets will drop to the bottom of the chamber 16 and will be carried off through the drain outlet 52 and pipe 54 back to the reservoir 36. Thus, the flow of air into the chamber 16 must be low enough so that it carries only the smaller and lighter lubricant droplets out of the outlet opening 56 but must be high enough to carry the lubricant droplets to and through the nozzles 14 with sufficient inertia to impinge on the disc 56.

In a chamber 16 which is 6 inches in diameter and 10 inches high having a baffle 22 extending 5½ inches from the top, air at a pressure of 0.75-1 psig at a flow rate of about 1.5 cubic feet/min. was found to provide the desired flow of the appropriate size lubricant particles to properly coat a disc 56.

What is claimed is:

1. A method for coating a disc with a thin film of a lubricant comprising the steps of:
   generating droplets of the lubricant at the top of one section of a chamber which is divided into two sections, which sections are connected together along the bottom of the chamber,
   admitting air under pressure into said one section of the chamber above the connection between the two sections of the chamber to carry said lubricant droplets into the other section of the chamber and to carry at least some of the droplets upwardly through the other section to an outlet at the top of the other section, controlling the flow of the air into the one section so as to control the size of the lubricant droplets carried upwardly through the other section, and directing the air-carried lubricant droplets flowing from the outlet onto the surface of a disc to be coated.

2. A method in accordance with claim 1 in which the lubricant droplets are generated by atomizing the lubricant with air.

3. An apparatus for coating a disc with a thin film of a lubricant comprising:
   a chamber having a baffle extending thereacross and vertically downwardly from the top of the chamber to a point spaced from the bottom to divide the chamber into two sections, one on each side of the baffle, which are connected together at the bottom of the chamber,
   means at the top of one of the sections for generating droplets of the lubricant and directing the droplets toward the bottom of the one section,
   means in said one section for admitting air under pressure into said one section at a level above the bottom of the baffle, said air adapted to carry the lubricant droplets under the baffle into the other section and to carry at least some of the lubricant droplets upwardly through said other section,
   means for controlling the flow of air into the chamber so as to permit the control of the size of the lubricant droplets which are carried up through the other section,
   an outlet at the top of the other section to allow air-carried lubricant droplets to flow out of the chamber, and
   means connecting the outlet to means for applying the lubricant droplets to a surface of a disc.

4. An apparatus in accordance with claim 3 in which the means for generating the droplets of the lubricant is an atomizer mounted at the top of the one section, said atomizer having an air outlet port connected to a source of air under pressure and a lubricant inlet port connected to a supply of the lubricant.

5. An apparatus in accordance with claim 4 including a drain outlet in the bottom of the chamber, said drain outlet being connected to the lubricant supply.

* * * * *